United States Patent Office 3,513,074
Patented May 19, 1970

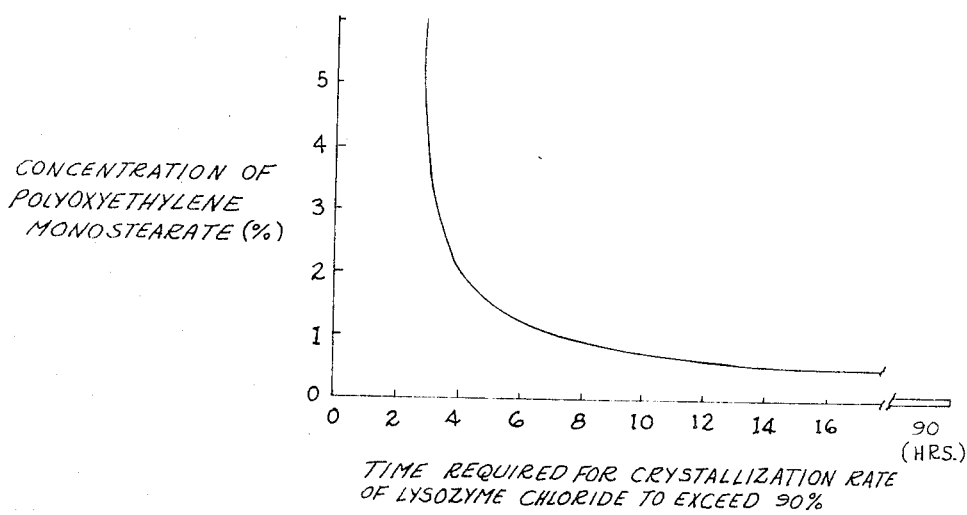

3,513,074
METHOD OF ACCELERATING THE CRYSTALLIZATION OF ALBUMEN LYSOZYME
Yoshitaka Matsuoka, Yoshio Hidaka, and Tsuyoshi Takahashi, Tokyo, Japan, assignors to Eisai Co., Ltd., Tokyo, Japan, a corporation of Japan
Filed Apr. 10, 1967, Ser. No. 629,791
Claims priority, application Japan, June 4, 1966, 41/35,682
Int. Cl. C07g 7/026
U.S. Cl. 195—66    8 Claims

ABSTRACT OF THE DISCLOSURE

A method of accelerating the crystallization of egg white lysozyme which comprises adding to a solution containing lysozyme or its salts at least about 0.5% by weight of a compound selected from the group consisting of nonionic surface active agents, polyalkylene glycols and lower alkylene glycols.

FIELD OF THE INVENTION

This invention relates to a method of accelerating the crystallization of egg white lysozyme or its lysozyme salts by adding to a material containing lysozyme or a lysozyme salt, a small amount of a nonionic surface active agent, polyalkylene glycol or a lower alkylene glycol.

Unless otherwise stated, the term "%" used in the present specification refers to amount by weight.

DESCRIPTION OF THE PRIOR ART

There have been reported several kinds of methods for preparing egg white lysozyme. The method most extensively used among them is the direct crystallization procedure of G. Alderton and H. L. Fevold. (See pages 1 to 5 of the Journal of Biological Chemistry, vol. 164, 1946.) It is a method wherein, after the pH of homogenized egg white has been adjusted to 9.5, 5% of sodium chloride is added to the egg white, a small amount of seed crystals is added thereto and the mixture is left at 4° C. for three to four days. 60 to 80% of lysozyme contained in the egg white are crystallized together with other insoluble materials and, therefore, this solid mixture is separated from the liquid phase. These crude crystals or lysozyme are dissolved in acetic acid at pH 4 to 6, the other insoluble materials are removed, 5% sodium chloride is added again to the solution and the pH of the solution is adjusted to between 9.5 and 11.0 so that isoelectric lysozyme may be recrystallized or 5% sodium bicarbonate is added to the acetic acid extract and then the pH is adjusted to between 8.0 and 8.5 so that lysozyme may be recrystallized as a carbonate.

It is known that, in the presence of 5% of sodium halide or potassium halide, refined lysozyme will crystallize in the form of the corresponding halide (such as, for example, lysozyme chloride, lysozyme bromide or lysozyme iodide) as at pH in the acid range. On the other hand, in the practical uses of lysozyme, lysozyme chloride is often demanded. However, the crystallization of these lysozyme halides will be so influenced by the amount of impurities (such as protein and mucoprotein, etc.) that, in the above-mentioned direct crystallization procedure, it is often impossible to crystallize a lysozyme halide either directly from egg white or even in the recrystallizing process. That is to say, in the recrystallizing process, if the amount of protein impurities is too great, the halide will not crystallize and, even if it is left for a long time, only an amorphous precipitate will be produced.

SUMMARY OF THE INVENTION

We have discovered that lysozyme or its salts will crystallize, irrespective of the concentration of impurities, by the addition of a small amount of a nonionic surface active agent, polyalkylene glycol or lower alkylene glycol, to a solution containing a lysozyme halide, and further, the crystallizing velocity will be remarkably accelerated. With respect to lysozyme salts, regardless of whether the impurities are present or not, the accelerating effect above mentioned will be obtained. On the other hand, with respect to isoelectric lysozyme, the crystallization accelerating effect will be obtained only when impurities are present.

According to the method of the present invention, it is possible even to directly crystallize a lysozyme halide from homogenized egg white. Any type of nonionic surface active agent can be used in the present invention. Among them, polyoxyethylene sorbitan monooleate (Tween type), polyoxyethylene monostearate (Myrj type), hydrogenated castor oil polyoxyethylene ether and polyoxyethylene oleyl alcohol (Brij type) are suitable. In the same type of the nonionic surface active agents, the crystallization accelerating effect will be increased with an increase in HLB (hydrophil lipophil balance) value. The HLB value should preferably be not less than 10.

The effect of accelerating the crystallization of lysozyme chloride brought about by the use of some typical types of nonionic surface active agents, polyalkylene glycols and lower alkylene glycols is shown in Table 1.

TABLE 1

| Crystallization accelerators | HLB | Accelerator concentration in percent | Time required for crystallization rate of lysozyme chloride to reach 90% in hours |
|---|---|---|---|
| Polyoxyethylene oleyl alcohol | 12.2 | 2 | 3.0 |
| Do | 16.0 | 2 | 1.5 |
| Do | 17.6 | 2 | 1.0 |
| Polyoxyethylene sorbitan monooleate | 15.0 | 2 | 2.5 |
| Polyoxyethylene monostearate | 15.2 | 2 | 2.0 |
| Hydrogenated castor oil polyethylene ether | 14.1 | 2 | 1.5 |
| Polyethylene glycol (400) | | 2 | 2.5 |
| Propylene glycol | | 4 | 4.0 |
| Control (no accelerator added) | | 0 | 10.0 |

Note.—Crystallizing conditions: Lysozyme concentration: 1.8%, impure protein concentration (egg-white albumins): 3.3%, pH: 4.5, sodium chloride concentration: 5% and temperature: 3° C.

When such an accelerator is added to the solution containing lysozyme in a concentration of about 0.5 to 4.0%, the desired effect will be obtained. If the concentration is higher than 4.0%, a substantial further increase in the crystallization accelerating effect will not be obtained.

The drawing is a graph showing the effect of adding various amounts of polyoxyethylene monostearate on the time required for 90% crystallization of lysozyme chloride.

One example which indicates the relation between the amount of polyoxyethylene monostearate added (HLB of 15.2) and its crystallization accelerating effect on the crystallization of the lysozyme chloride is shown in FIG. 1. This graph relates to a crystallization operation in which a lysozyme solution (containing lysozyme 1.3%; protein impurities 2.7%) was adjusted to pH 4.5, 5% of sodium chloride was added, and then the solution was allowed to stand in an ice box (about 3° C.).

In the above-described direct crystallization procedure of Alderton and Fevold, in order to obtain crystals of lysozmye at a high yield, it is necessary to exactly regulate the crystallizing conditions, such as the salt concentration (5%), temperature (4° C.) and pH (varied by the type of the lysozyme or its salt) and to allow the solution to stand for a relatively long time. But, according to the method of the present invention, when a crystallization accelerator is added, the range of temperature, pH and salt concentration necessary for the crystallization will be remarkably expanded. That is to say, in the presence of an accelerator, lysozyme (or its salts) crystals will be crystallized even at room temperature (20° C.), within a short time at a sufficient yield. Further, in the conventional method, when the sodium chloride concentration is made higher than 5%, lysozyme chloride will not crystallize but will become an amorphous precipitate irrespective of whether protein impurities are present or not. But, in the presence of accelerator of the present invention, lysozyme chloride will be crystallized even when the sodium chloride concentration is elevated to 7%.

As described above, when a small amount of a nonionic surface active agent, polyalkylene glycol, or lower alkylene glycol is added, (1) irrespective of the concentration of the protein impurities, a lysozyme halide will crystallize, (2) the crystallization of the lysozyme halide, lysozyme carbonate or isoelectric lysozyme will be completed within a remarkably short time, (3) it will not be always necessary to exactly regulate the crsytallizing conditions (salt concentration, temperature and pH). These crystallization accelerating effects will be great advantages to the industrial production of lysozyme.

DETAILED DESCRIPTION

Examples of the present invention are given in the following.

Example 1

The pH of homogenized egg white was adjusted to 9.5 with N-sodium hydroxide. Then 5% sodium chloride was added to the egg white. A small amount of isoelectric lysozyme crystals was added thereto. The mixture was left at 4° C. for four days, then isoelectric lysozyme was crystallized. These crystals were separated together with other insoluble materials. The lysozyme was extracted with dilute hydrochloric acid of pH 4.5 and the insoluble were removed by filtration to obtain a crude lysozyme extract. The lysozyme concentration of this crude lysozyme extract was 2.0% and the concentration of the protein impurities (egg-white albumins) was 3.6%.

20 ml. of 20% aqueous solution of Nikkol MYS–25 (trademark for polyoxyethylene monostearate produced by Nikko Chemicals Company, Ltd. Japan) was added to 180 ml. of the crude lysozyme extract. The sodium chloride concentration was readjusted to 5% and the pH to 4.5. When the mixture was left at 3° C., for two hours, 91.3% of lysozyme chloride was crystallized and, after six hours, 95.6% had crystallized.

On the other hand, a control was prepared by adding 20 ml. of water instead of the nonionic surface active agent solution to 180 ml. of the crude lysozyme concentrate and then the mixture was left under the same crystallizing conditions. Crystals of lysozyme chloride were not recognized at all but only an amorphous precipitate was produced. The amount of the amorphous precipitate was 27.0% in two hours and 79.4% in six hours.

Example 2

The pH of the crude lysozyme concentrate obtained in Example 1 was adjusted to 9.5 with N-sodium hydroxide solution. The concentration of lysozyme in this solution was about 1.5% and the protein impurities were about 2.5%. 10 ml. of 20% aqueous solution of Emalex–545 (trademark for polyoxyethylene oleyl alcohol produced by Japan Emulsion Company, Ltd., Japan) was added to 90 ml. of said solution. The sodium chloride concentration was made 5% and the mixture was left at room temperature (20° C.). The crystallization rate of isoelectric lysozyme was measured with the lapse of time. The results are shown in Table 2. A control was prepared by adding 10 ml. of water instead of the 20% solution of Emalex–545 and leaving the mixture under the same conditions.

TABLE 2

| | Crystallization rate of isoelectric lysozyme, percent | | | |
|---|---|---|---|---|
| | After 2 hrs. | After 3 hrs. | After 4 hrs. | After 5 hrs. |
| Emalex-545 added (2%) | 6.5 | 29.5 | 88.0 | 92.4 |
| Control (no addition) | 0 | 3.3 | 9.5 | 34.8 |

Example 3

N-HCL was added to homogenized egg white to adjust the pH to 4.5. To 1 liter of egg white was added 20 g. of Emalex–545 and 50 g. of sodium choride and same was dissolved therein. The mixture was left in an ice box. After 24 hours, crystals of lysozyme chloride were recognized. The crystallization rates of lysozyme chloride after three days and five days were 51% and 80%, respectively. On the other hand, from egg white to which no Emalex–545 had been added, crystallization of lysozyme chloride was not recognized at all under the same conditions and only an amorphous precipitate was produced after two days.

Example 4

20 ml. of 20% aqueous solution of polyethylene glycol (of a polymerization degree of 400) was added to 180 ml. of the crude lysozyme extract obtained in Example 1.

A control was also prepared by adding 20 ml. of water instead of 20 ml. of 20% aqueous solution of polyethylene glycol.

To each of these solutions was added 10 g. of sodium chloride. Then, these solutions were adjusted to pH 4.5 and left at a low temperature (3° C.). In the case where polyethylene glycol was added, 71% of lysozyme chloride crystallized in 30 minutes and 89% in two hours. In the control solution, no crystal of lysoyme chloride was obtained but an amorphous precipitate was produced and the precipitation rate in two hours was only 27%.

The embodiments of the invention in which an exclusive property or privilege is claimed are defined as follows:

1. A method for preparing egg white lysozyme or egg white lysozyme salts by a crystallization procedure which comprises (1) adding (a) to an aqueous solution containing egg white lysozyme or its salt, (b) from about 0.5 percent to about 4.0 percent by weight of said solution of a compound selected from the group consisting of nonionic surface active agents, polyalkylene glycols and lower alkylene glycols as a crystallization accelerator, and (2) crystallizing said lysozyme or its salt from said solution.

2. The method as claimed in claim 1, wherein said nonionic surface active agent is selected from the group consisting of polyoxyethylene sorbitan monooleate, polyoxyethylene monostearate, hydrogenated castor oil polyoxyethylene ether and polyoxyethylene oleyl alcohol.

3. The method as claimed in claim 2, wherein the HLB of said nonionic surface active agent is not less than 10.

4. The method as claimed in claim 1, wherein said polyalkylene glycol is polyethylene glycol.

5. The method as claimed in claim 1, wherein said lower alkylene glycol is propylene glycol.

6. The method as claimed in claim 1, wherein said egg white lysozyme is isoelectric lysozyme.

7. The method as claimed in claim 1, wherein said egg white lysozyme salt is a salt selected from the group consisting of lysozyme halides and lysozyme carbonate.

8. The method as claimed in claim 7, wherein said lysozyme halide is lysozyme chloride.

References Cited

UNITED STATES PATENTS 3,242,056 3/1966 Dubois-Prevost _____ 195—63
3,268,346 8/1966 Spicer et al. _____ 99—210

LIONEL M. SHAPIRO, Primary Examiner